United States Patent [19]

Schloss

[11] Patent Number: 5,428,256

[45] Date of Patent: Jun. 27, 1995

[54] SUBMERSIBLE MOTOR ENCLOSURE

[75] Inventor: C. M. Schloss, Englewood, Colo.

[73] Assignee: Schloss Engineering Equipment, Inc., Aurora, Colo.

[21] Appl. No.: 248,883

[22] Filed: May 25, 1994

Related U.S. Application Data

[63] Continuation of Ser. No. 987,955, Dec. 8, 1992, abandoned.

[51] Int. Cl.⁶ .................... H02K 5/10; B01D 33/00
[52] U.S. Cl. ................................. 310/87; 210/159
[58] Field of Search ................ 310/85, 87, 88, 89; 210/153, 158, 159, 408

[56] References Cited

U.S. PATENT DOCUMENTS

| | | | |
|---|---|---|---|
| 3,591,006 | 7/1971 | Daferner | 210/159 |
| 4,561,975 | 12/1985 | Schloss | 210/155 |
| 4,689,510 | 8/1987 | Kuivamaki et al. | 310/87 |
| 4,857,182 | 8/1989 | Jackson | 210/159 |
| 4,940,911 | 7/1990 | Wilson | 310/87 |
| 5,018,971 | 5/1991 | Trawoger et al. | 433/92 |
| 5,087,846 | 2/1992 | Wright | 310/87 |
| 5,246,573 | 9/1993 | Lodholz et al. | 210/159 |

FOREIGN PATENT DOCUMENTS

| | | | |
|---|---|---|---|
| 1096478 | 12/1967 | United Kingdom | 310/87 |
| 1130958 | 12/1984 | U.S.S.R. | 310/87 |

Primary Examiner—Thomas M. Dougherty
Assistant Examiner—Matthew V. Nguyen
Attorney, Agent, or Firm—Beaton & Folsom

[57] ABSTRACT

A submersible motor enclosure and method of operating the same, having particular utility for enclosing a motor used to power a screen rake in a waste water treatment plant. The enclosure has a closed end and an open end coverable by a cover plate. A pressure source is in communication with the housing interior to pressurize the interior and to resist the migration of water into the housing. A discharge port may be included to collect and discharge any water that enters or condenses in the housing. An alternate embodiment utilizes a vacuum source in communication with the discharge port instead of the pressure source in communication with the housing interior.

15 Claims, 3 Drawing Sheets

5,428,256

SUBMERSIBLE MOTOR ENCLOSURE

This is a continuation of application Ser. No. 07/987,955 filed on Dec. 8, 1992, now abandoned.

FIELD OF THE INVENTION

The present invention relates to the field of motor enclosures to protect an electrical motor when submersed in a liquid. In particular, the present invention relates to a submersible motor enclosure for protecting from periodic flooding a motor used on a climbing screen device in a waste water treatment facility.

BACKGROUND OF THE INVENTION

Waste water entering a waste water treatment facility normally includes a substantial amount of large non-treatable material such as trash, garbage, cans, bottles, leaves, wood and plastic. If not removed at the outset, this material would collect in and interfere with the operation of the various treatment elements of the facility. A common approach to removing this material is to position a screen in the open channel through which the incoming water flows. The screen intercepts the material while allowing the water to continue its flow into the facility.

As the screen intercepts and retains the trash, the trash continually builds up on the screen. In order to prevent the trash from building up on the screen to the point where the flow of water is impeded, it is necessary to periodically remove the trash from the screen in some manner. The usual manner for removing the trash from the screen is to use a mechanical rake which rakes from the bottom of the screen toward the top. For example, one such device collects trash from the screen as it moves upward over the side of the screen presented to the incoming water, then moves over the top of the screen and out of the water flow and deposits the collected trash into a collector, then moves down the other side of the screen and under the bottom of the screen, and then moves back up the side of the screen presented to the incoming water to begin the process over again.

The rakes that are used to remove collected trash from the screen must be powered in some way. While it is possible to simply operate some type of rake assembly manually on an as-needed basis, the preferred approach is to power the rakes continuously with an electrical motor. The motor is used to drive a sprocket which propels a chain around the screen. The chain in turn is mounted to the rake assembly. See, for example, U.S. Pat. No. 3,591,00 by Daferner et al. Such motorized rakes are now very common in the industry due to their effectiveness, continuous operation and relative ease of maintenance.

A drawback to the use of motorized rake assemblies is that the motor may become flooded by the waste water. The motor is normally positioned such that it does not become submerged in the water. However, the water level in the incoming channel may vary quickly and dramatically due to abrupt changes in weather or due to high load conditions at certain times of the day. The rapidly rising water level can then partially or fully submerge the motor, thereby short-circuiting it or even destroying it.

One method for preventing the motor from becoming submerged in the incoming water is to include water sensors which detect the rising water level and then alter the operation of the rake assembly to move the motor above the water level. Such a method is disclosed in U.S. Pat. No. 4,857,182 by Jackson. A limitation to the sensor devices exemplified by the Jackson patent is that the motor may still become submerged if the water level is rising fast enough or if the water level rises at a time when the rake assembly is near the bottom of its travel under the screen.

Another approach to prevent the motor from becoming inoperative as a result of being submerged in the incoming flow is to enclose the motor in a waterproof housing. Thus the housing enclosing the motor may become submerged in the incoming flow of waste water while the motor itself remains dry. Such an apparatus is disclosed in U.S. Pat. No. 5,087,846 by Wright in which the enclosure comprises a two piece hermetically sealed housing. Aside from the fact that the apparatus described in the Wright patent interferes with normal air circulation to cool the motor, a limitation to the apparatus is that the housing may leak. The leakage is especially likely due to the temperature-induced pressure changes in the housing. For example, if the housing is sealed tight on a day when the ambient air temperature is 40° F., and the full load operating temperature of the motor reaches 184° F., then the interior air pressure will build to several pounds per square inch. Unless the housing seals are very good, some of the interior air will leak out. When the motor is then shut off and the interior air cools, there will be a negative interior air pressure. This negative interior air pressure combined with the positive exterior hydraulic pressure when the housing is submerged in the incoming flow, will force water through the seals and into the housing. It is possible to seal the housing with a positive interior pressure or to take care that the housing is sealed when the ambient air is warm, as on a hot day, but both of these approaches merely delay the problem of developing a negative interior air pressure leading to leakage, rather than prevent the problem.

Yet another approach to prevent the motor from becoming inoperative as a result of being submerged is to enclose the motor in an enclosure connected to a hollow arm of the screen, which when immersed in water pressurizes the enclosure. As the arm emerges from the water, the water in the arm drains out and the pressure returns to ambient. The enclosure is thus somewhat analogous to a diving bell, having an enclosed top to trap air and an open bottom. In such an enclosure the volume of air in the immersed arm of the screen must be exactly sized, or the enclosure is likely to "sip" water when a warm motor cools while the enclosure is submerged.

SUMMARY OF THE INVENTION

An object of the present invention is to provide a submersible motor enclosure with particular utility as an enclosure for a screen rake used in a waste water treatment facility. The enclosure maintains a positive pressure at all times, so that any leakage will be of air out of the enclosure rather than of water into the enclosure. Therefore, the temperature of the ambient air and the interior air pressure when the enclosure is sealed is not critical.

The enclosure is a water-tight container secured to a mount on the screen rake and closed with a removable water-tight cover. The enclosure has an air inlet which is connected to a source of positive pressure such as a compressor, bottled gas or pistons or pumps. The rotation of the motor shaft may be transferred to a drive mechanism such as a speed reducer and from there to outside the enclosure and into the mechanism that drives the rake, through suitable seals or gaskets in the enclosure or cover. If the seals of the enclosure are imperfect or if they deteriorate so that fluid can pass, it will be the pressurized air that passes out of the enclosure and into the water rather than the water that passes into the enclosure and into the pressurized air.

The enclosure may also include a discharge system for removing any water that somehow leaks into the enclosure or condenses out of the air in the enclosure. The discharge system may include a discharge conduit having an opening in communication with the bottom interior surface of the enclosure and an outlet outside of the conduit, so that water that condenses in the enclosure or leaks into the enclosure flows to the interior bottom of the enclosure and then is forced out the discharge conduit by the positive interior pressure in the conduit. The discharge conduit may include a one-way "check" valve to prevent fluid from flowing backward through the conduit and into the enclosure when the positive interior pressure is relieved, such as when the unit is not in operation or the pressure source fails, and pressure regulating devices such as a relief valve. The advantages of using a discharge system, in addition to providing for the removal of water before it can accumulate, include providing a supply of flushing and cooling air for the interior of the enclosure.

In another embodiment, the air inlet has an intake opening positioned above the highest water level and open to atmospheric air. A discharge conduit has an opening in communication with the bottom interior of the enclosure to collect liquid that leaks into or collects inside of the enclosure, as in the case of the embodiment described above. Additionally, the discharge conduit is connected to a vacuum source such as a vacuum pump, a liquid ring blower or an aspirator. The vacuum source draws collected liquid out of the interior of the enclosure and discharges it into the waste water or into a collection area. Flow control and regulating valves may be incorporated into the inlet, the discharge conduit, or both, as appropriate to maintain the desired flow of air into the inlet and through the enclosure and out the outlet. As in the embodiment described above using a pressure source in communication with the inlet, this embodiment provides for the removal of any fluid that collects in the enclosure and also provides cooling flushing air for the motor in the interior of the enclosure.

DETAILED DESCRIPTION OF THE INVENTION

Figure 1:
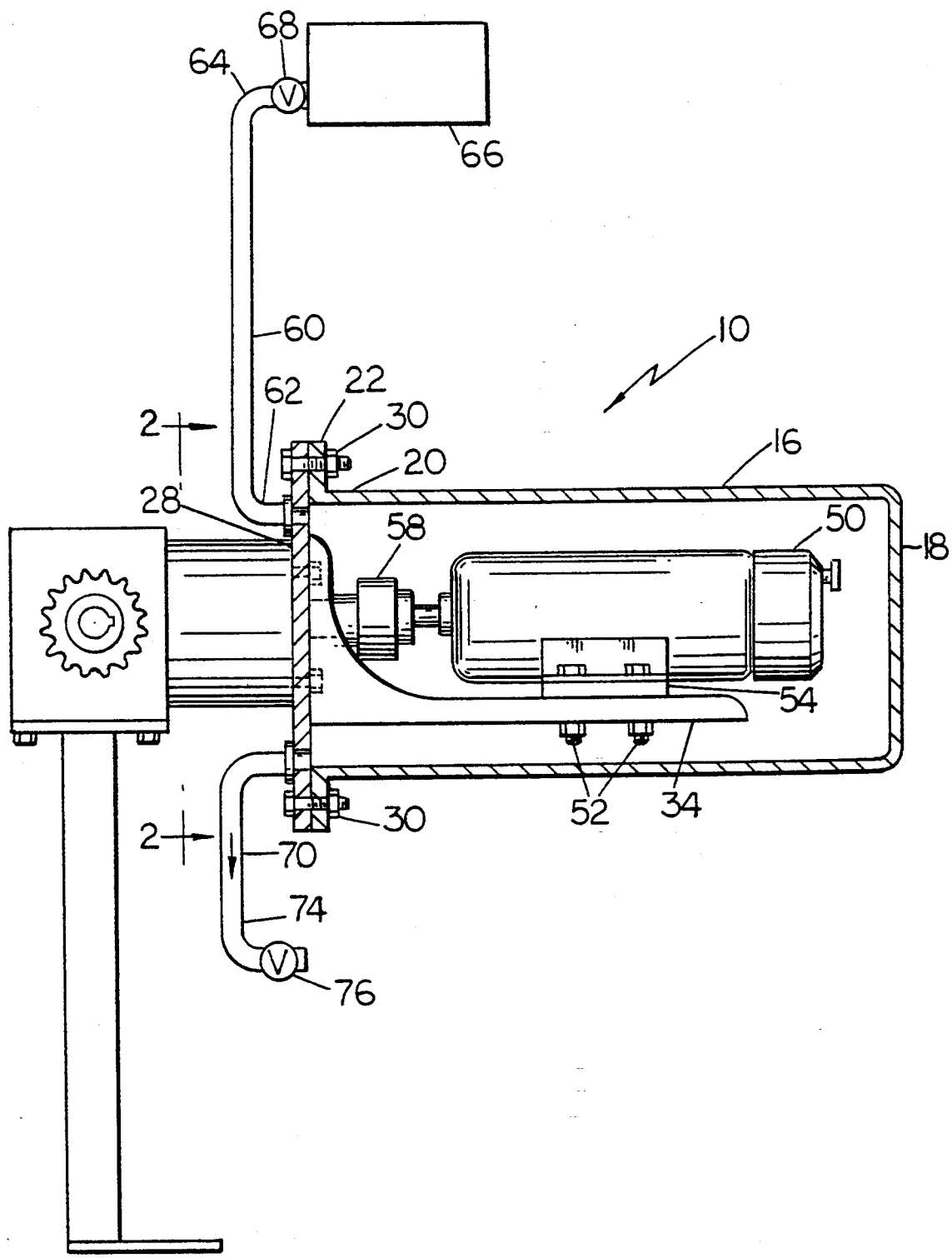
FIG. 1 is a partial cross-sectional elevation view of a motor enclosure in accordance with the present invention.

A partial sectional elevational view of the invention is shown in FIG. 1. The invention 10 includes a substantially cylindrical housing 16 to enclose a motor 50, with a closed end 18 and an open end 20. Around the open end 20 is a radially extending circumferential flange 22. The open end 20 is covered with a cover plate 28 which is secured to the housing 16 by a set of cover plate bolts 30 extending through the cover plate 28 and the housing flange 22 (which is better shown in the end view of FIG. 2).

Mounted on the interior side of the cover plate 28 is a motor bracket 34. The motor bracket 34 in the preferred embodiment is attached to the cover plate 28 by a set of motor bolts 38 through the cover plate 28 and the motor bracket 34. By attaching the motor bracket 34 to the cover plate 28, the motor bracket is cantilevered over the bottom of the housing 16 to keep it above any water that may collect on the bottom of the housing 16, and also allows the motor 50 to be accessed readily by removing the cover plate 28 and withdrawing the assembly of the cover plate 28, motor bracket 34 and motor 50 from the housing 16.

The motor 50 is of the explosion-proof brake type known in the field, and is mounted to the motor bracket by a set of motor mounting bolts 52 extending through a motor mounting plate 54 and the motor bracket 34. The shaft of the motor may be attached to a high speed motor coupling 58 which extends through a seal 42 (also shown in FIG. 2) in the cover plate 28 and attaches to a speed reducer 40. The speed reducer 40 is in turn attached to the movable rake (not shown) in the manner known in the art.

An air inlet conduit 60 is attached to the cover plate 28 or housing and extends from the cover plate to a higher elevation above the high water level of the incoming flow. The end 62 of the air inlet conduit that is attached to the cover plate opens into the housing 16 and the other end 64 is in communication with a pressure source 66 (shown schematically in FIG. 1) such as a compressor, bottled gas or pistons or pumps which may be energized by the action of the rake assembly or drive mechanism. A valve 68 in the conduit 60 may be used to prevent back flow from the housing 16 into the pressure source 66.

In operation, the pressure source 66 maintains a pressure in the interior of the housing 16 that is greater than the combination of atmospheric and whatever hydraulic pressure is exerted on the exterior of the housing when the housing becomes submerged. Thus, in the event that the seal between the cover plate 28 and the housing flange 22 or the seal in the cover plate 28 around the motor coupling 58 shaft become imperfect, the interior pressure will prevent water from seeping into the housing. Instead, the air in the housing will be forced from the interior of the housing out through the imperfect seal and into the water.

Figure 2:
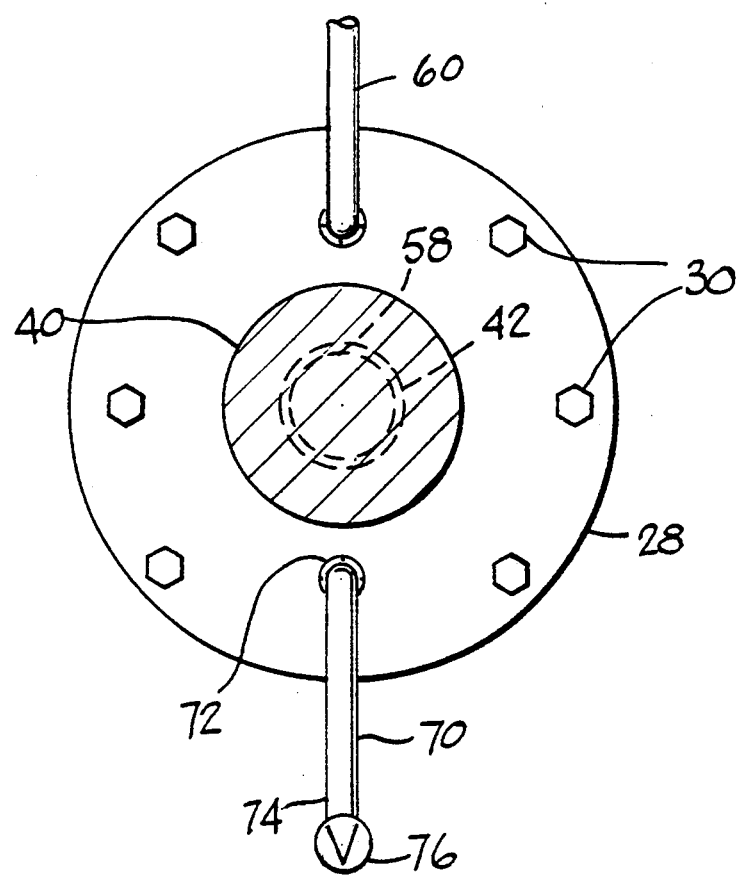
FIG. 2 is an end view of the motor enclosure of FIG. 1, taken along line 2—2 of FIG. 1.

The embodiment of FIGS. 1 and 2 also includes a water discharge system which comprises a discharge conduit 70 with one end 72 in communication with the interior of the housing 16 and at or near the housing bottom. The other end 74 of the discharge conduit 70 is open to release discharged water and air. The discharge conduit 70 may include a pressure relief valve 76 which allows discharge only when the pressure in the housing interior exceeds a threshold level. Alternatively, the valve may be manually or electrically operated on a periodic or as-needed basis.

In the embodiment utilizing a water discharge system such as the discharge conduit 70 of FIGS. 1 and 2, any water that collects in the housing interior by leaking through an imperfect seal or by condensation out of the air in the housing, collects in the bottom interior of the housing and can be discharged. The discharge is accomplished by the water in the bottom interior of the housing drainage into the discharge conduit 70 by the force of gravity or being forced into the discharge conduit 70 by the flow of pressurized air from the pressure source 66 through the inlet conduit 60 and through the housing interior. Once the water is into the discharge conduit 70, the flow of pressurized air forces it through the discharge conduit 70 and out the end 76. If a valve is included in the discharge conduit 70 such as the relief valve 76 shown in FIGS. 1 and 2, the water is discharged only when that valve is opened, as by the build-up of pressure in the housing interior in the case of a relief valve or by the actuation of the valve in the case of actuable valves.

Figure 3:
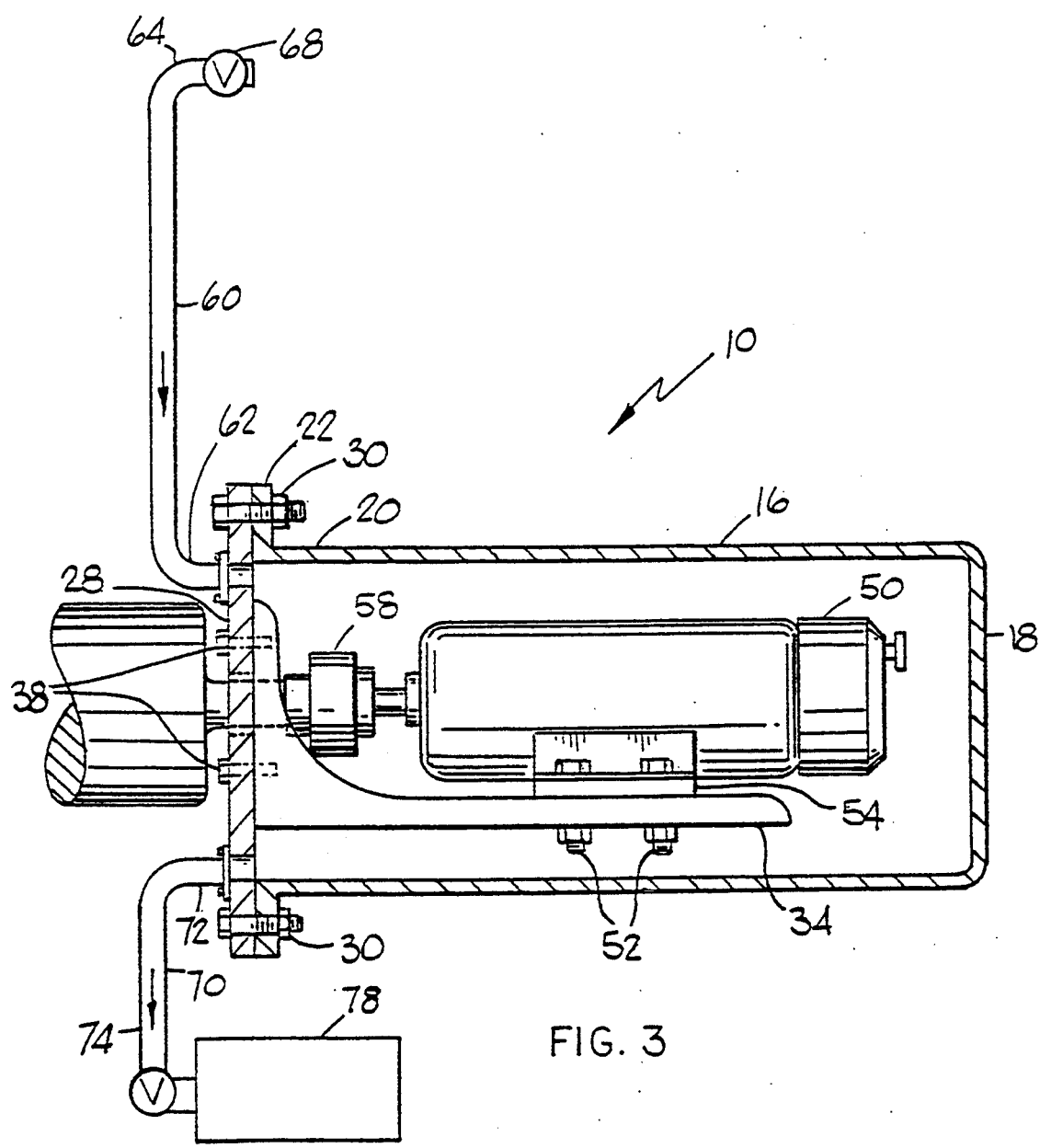
FIG. 3 is a partial cross-sectional elevation view of a motor enclosure in accordance with an alternative embodiment of the present invention.

Another embodiment of the invention 10 is shown in FIG. 3, in which the pressure source in communication with the inlet conduit 60 is omitted. The inlet conduit 60 has the open end 64 positioned above the high water level so that water does not flood the inlet conduit 60 and may include a filter or the valve 68 shown in FIG. 3 to prevent impurities from entering. There is a vacuum source 78 (shown schematically in FIG. 3) in the discharge conduit such as a vacuum pump, a liquid ring blower or an aspirator. Flow control and regulatory valves may be included as appropriate, such as the valve 76 shown in FIG. 3.

What is claimed is:

1. An apparatus which may be used for driving rake assembly on a bar screen, comprising: a housing having an interior space and an opening in the housing; a cover which may be removably attached to the housing and covering the opening in the housing such that the housing and the attached cover are substantially impervious to water; a source of pressurized air in communication with the housing interior space; and a motor mounted in the housing interior for driving a rake assembly on a bar screen; wherein the housing has a fluid discharge port for discharging fluid therefrom.

2. The apparatus of claim 1, wherein the housing includes a flange around the opening and the cover is bolted in the flange.

3. The apparatus of claim 1, wherein the motor is mounted to the cover so that the motor can be removed from the housing interior space or maintenance by detaching the cover from the housing.

4. The apparatus of claim 1, wherein the housing interior has a bottom and the fluid discharge port is located at said bottom.

5. The apparatus of claim 4, wherein the port is in communication with a discharge conduit to move the discharged fluid to a discharge location outside the housing.

6. The apparatus of claim 5, further comprising a valve positioned in said discharge conduit to control the flow of fluid therethrough.

7. The apparatus of claim 6, wherein the valve is a pressure relief valve which allows fluid to pass when the pressure in the housing reaches a predetermined threshold.

8. The apparatus of claim 1, further comprising drive means for transferring a force from the motor to the rake assembly.

9. The apparatus of claim 8, wherein the drive means includes a shaft extending from inside the housing and through the cover plate to outside the housing.

10. An apparatus which may be used for driving a rake assembly on a bar screen, comprising: a housing having an interior space and an opening in the housing; a cover removably attached to the housing and covering the opening in the housing such that the housing and the attached cover are substantially impervious to water; an air inlet to the housing; an air outlet from the housing and in communication with a vacuum source outside the housing to draw air through the inlet and into the housing and out the outlet; and a motor mounted in the housing interior space for driving a rake assembly on a bar screen.

11. A method of operating a rake assembly on a screen in which the rake is driven by a motor enclosed in a housing submersible in water, the housing having an interior space and an opening and removable cover attached to the housing and covering the opening in the housing, and an inlet to the housing interior space; the method comprising steps of: activating said motor in order to drive said rake assembly on said screen; and applying pressurized air to the inlet so that pressurized air is forced from inside the housing to outside the housing and so that water does not migrate into the housing.

12. The method of claim 11, wherein the housing includes a discharge port and further comprising a step of flowing pressurized air out the discharge port.

13. The method of claim 12, wherein the housing has a bottom and the discharge port is located in the bottom so that fluid in the housing collects at the discharge port and further comprising a step of flowing the fluid out the discharge port.

14. A method of operating a rake assembly on a screen in which the rake is driven by a motor enclosed in a housing having an interior space and an opening and a cover attached to the housing and covering the opening, and an inlet to the housing interior space and an outlet from the housing interior space, the method comprising steps of:

activating said motor in order to drive said rake assembly on said screen; and applying a vacuum source to the outlet to draw air through the inlet and to draw air and fluid collected in the housing out the outlet.

15. An apparatus which may be used for driving a rake assembly on a bar screen, comprising: a housing having an interior space and an opening in the housing; a cover which may be removably attached to the housing, and covering the opening in the housing such that the housing and the cover are substantially impervious to water; an inlet port to the housing and in fluid communication with said interior space; an outlet port from the housing and in fluid communication with said interior space; means outside the housing for establishing a pressure differential between said inlet port and said outlet port; and a motor mounted in the housing interior space for driving a rake assembly on a bar screen.

* * * * *